US007672363B2

(12) United States Patent
Bokhour

(10) Patent No.: US 7,672,363 B2
(45) Date of Patent: Mar. 2, 2010

(54) METHOD OF AND SYSTEM FOR DETERMINING THE DELAY OF DIGITAL SIGNALS

(75) Inventor: Edward Bokhour, Concord, MA (US)

(73) Assignee: Tag Safety Systems, Inc., Concord, MA (US)

( * ) Notice: Subject to any disclaimer, the term of this patent is extended or adjusted under 35 U.S.C. 154(b) by 0 days.

(21) Appl. No.: 11/139,063

(22) Filed: May 27, 2005

(65) Prior Publication Data

US 2005/0276318 A1  Dec. 15, 2005

Related U.S. Application Data

(60) Provisional application No. 60/574,914, filed on May 27, 2004.

(51) Int. Cl.
*H04B 1/38* (2006.01)
*H04B 3/46* (2006.01)
*H04B 17/00* (2006.01)

(52) U.S. Cl. .................. 375/221; 375/224; 375/377

(58) Field of Classification Search .................. 375/219, 375/220, 295, 358, 363, 221, 354, 355, 356, 375/257, 259, 377, 224; 455/24, 69, 73, 455/456.1; 342/118, 126, 357.08, 450, 458; 702/176
See application file for complete search history.

(56) References Cited

U.S. PATENT DOCUMENTS 4,041,774 A * 8/1977 Morris et al. .................. 73/610
4,670,757 A * 6/1987 Munich et al. ............... 342/450
5,479,372 A * 12/1995 Sato et al. .................... 365/222
5,764,086 A * 6/1998 Nagamatsu et al. ........... 327/65
5,872,774 A * 2/1999 Wheatley et al. ............. 370/335
6,047,021 A * 4/2000 Grimes et al. ................ 375/220
6,133,876 A * 10/2000 Fullerton et al. ............. 342/375
6,408,186 B1 * 6/2002 Park et al. ................. 455/456.1
6,975,682 B2 * 12/2005 Cosand ........................ 375/247
2005/0232227 A1 * 10/2005 Jorgenson et al. ............ 370/351
2005/0265383 A1 * 12/2005 Melpignano et al. ......... 370/465

OTHER PUBLICATIONS

Rohan de Silva, "A Simple Method of ATM ABR Congestion Control", 5th International Conference on High Speed Networks and Multimedia Communiucations, Jul. 3-5, 2002, pp. 42-45.*
Timothy Krout, "The Effects of Asymetric Satellite Networks on Protocols", Proceeding of Military Communications Conference, 1998, MILCOM 1998, IEEE, Oct. 18-21, 1998, vol. 3, pp. 1072-1076.*

* cited by examiner

*Primary Examiner*—Betsy L Deppe
(74) *Attorney, Agent, or Firm*—McDermott Will & Emery LLP

(57) ABSTRACT

A method of and system for determining the time required for a digital bit or bit stream to traverse a round-trip path from a source transceiver to at least one destination transceiver and back is disclosed. The relative timing of the transmitted bit or bit stream is compared to the return bit or bit stream using a high speed comparison configuration so as to provide in substantially real-time various measurements related to or derived from the time required to traverse the round trip path, including distance measurement in indoor positioning, real-time locating, adaptive cruise control, intelligent transportation systems, robotics, collision avoidance, personnel accountability, emergency location, search/rescue. In addition, a method of and system for determining the distance between transceivers, and a method of and system for determining the angular position of a transceiver with respect to at least two other transceivers are disclosed.

26 Claims, 13 Drawing Sheets

| ACTUAL DELAY | OUT OF PHASE NOISE | LEADING EDGE BYTE | /LE | TRAILING EDGE BYTE | /LE (DECIMAL) | TE (DECIMAL) | /LE' (bits) | TE' (bits) | AVG TELE | OUTPUT (Rounded up) |
|---|---|---|---|---|---|---|---|---|---|---|
| 0 | 0 | 11111111 | 00000000 | 00000000 | 0 | 0 | 0.00 | 0.00 | 0.00 | 0.00 |
| 0 | 1 | 11111110 | 00000001 | 00000000 | 1 | 0 | 1.00 | 0.00 | 1.00 | 0.00 |
| 0 | 2 | 11111100 | 00000011 | 00000000 | 3 | 0 | 2.00 | 0.00 | 2.00 | 0.00 |
| 0 | 3 | 11111000 | 00000111 | 00000000 | 7 | 0 | 3.00 | 0.00 | 3.00 | 0.00 |
| 0 | 4 | 11110000 | 00001111 | 00000000 | 15 | 0 | 4.00 | 0.00 | 4.00 | 0.00 |
| 0 | 5 | 11100000 | 00011111 | 00000000 | 31 | 0 | 5.00 | 0.00 | 5.00 | 0.00 |
| 0 | 6 | 11000000 | 00111111 | 00000000 | 63 | 0 | 6.00 | 0.00 | 6.00 | 0.00 |
| 0 | 7 | 10000000 | 01111111 | 00000000 | 127 | 0 | 7.00 | 0.00 | 7.00 | 0.00 |
| 0 | 8 | 00000000 | 11111111 | 00000000 | 255 | 0 | 8.00 | 0.00 | 8.00 | 0.00 |
| 1 | 0 | 11111110 | 00000001 | 00000001 | 1 | 1 | 1.00 | 1.00 | 1.58 | 1.00 |
| 1 | 1 | 11111100 | 00000011 | 00000001 | 3 | 1 | 2.00 | 1.00 | 2.32 | 1.00 |
| 1 | 2 | 11111000 | 00000111 | 00000001 | 7 | 1 | 3.00 | 1.00 | 3.17 | 1.00 |
| 1 | 3 | 11110000 | 00001111 | 00000001 | 15 | 1 | 4.00 | 1.00 | 4.09 | 1.00 |
| 1 | 4 | 11100000 | 00011111 | 00000001 | 31 | 1 | 5.00 | 1.00 | 5.04 | 1.00 |
| 1 | 5 | 11000000 | 00111111 | 00000001 | 63 | 1 | 6.00 | 1.00 | 6.02 | 1.00 |
| 1 | 6 | 10000000 | 01111111 | 00000001 | 127 | 1 | 7.00 | 1.00 | 7.01 | 1.00 |
| 1 | 7 | 00000000 | 11111111 | 00000001 | 255 | 1 | 8.00 | 1.00 | 8.01 | 1.00 |
| 1 | 8 | 00000001 | 11111110 | 00000001 | 254 | 1 | 7.99 | 1.00 | 8.00 | 1.00 |
| 2 | 0 | 11111100 | 00000011 | 00000011 | 3 | 3 | 2.00 | 2.00 | 2.81 | 2.00 |
| 2 | 1 | 11111000 | 00000111 | 00000011 | 7 | 3 | 3.00 | 2.00 | 3.46 | 2.00 |
| 2 | 2 | 11110000 | 00001111 | 00000011 | 15 | 3 | 4.00 | 2.00 | 4.25 | 2.00 |
| 2 | 3 | 11100000 | 00011111 | 00000011 | 31 | 3 | 5.00 | 2.00 | 5.13 | 2.00 |
| 2 | 4 | 11000000 | 00111111 | 00000011 | 63 | 3 | 6.00 | 2.00 | 6.07 | 2.00 |
| 2 | 5 | 10000000 | 01111111 | 00000011 | 127 | 3 | 7.00 | 2.00 | 7.03 | 2.00 |
| 2 | 6 | 00000000 | 11111111 | 00000011 | 255 | 3 | 8.00 | 2.00 | 8.02 | 2.00 |
| 2 | 7 | 00000001 | 11111110 | 00000011 | 254 | 3 | 7.99 | 2.00 | 8.01 | 2.00 |
| 2 | 8 | 00000011 | 11111100 | 00000011 | 252 | 3 | 7.98 | 2.00 | 8.00 | 2.00 |
| 3 | 0 | 11111000 | 00000111 | 00000111 | 7 | 7 | 3.00 | 3.00 | 3.91 | 3.00 |
| 3 | 1 | 11110000 | 00001111 | 00000111 | 15 | 7 | 4.00 | 3.00 | 4.52 | 3.00 |
| 3 | 2 | 11100000 | 00011111 | 00000111 | 31 | 7 | 5.00 | 3.00 | 5.29 | 3.00 |
| 3 | 3 | 11000000 | 00111111 | 00000111 | 63 | 7 | 6.00 | 3.00 | 6.15 | 3.00 |
| 3 | 4 | 10000000 | 01111111 | 00000111 | 127 | 7 | 7.00 | 3.00 | 7.08 | 3.00 |
| 3 | 5 | 00000000 | 11111111 | 00000111 | 255 | 7 | 8.00 | 3.00 | 8.04 | 3.00 |
| 3 | 6 | 00000001 | 11111110 | 00000111 | 254 | 7 | 7.99 | 3.00 | 8.03 | 3.00 |
| 3 | 7 | 00000011 | 11111100 | 00000111 | 252 | 7 | 7.98 | 3.00 | 8.02 | 3.00 |
| 3 | 8 | 00000111 | 11111000 | 00000111 | 248 | 7 | 7.96 | 3.00 | 8.00 | 3.00 |

FIGURE 6

METHOD OF AND SYSTEM FOR DETERMINING THE DELAY OF DIGITAL SIGNALS

RELATED APPLICATIONS

The present application is related to and claims priority from U.S. provisional patent application Ser. No. 60/574,914 filed May 27, 2004.

FIELD OF THE DISCLOSURE

The present disclosure relates generally to a method of determining the delay time (or transit time, or propagation delay) of a digital signal transmitted from a source and returned to that source, regardless of the transmission medium. More specifically, a method of comparing a transmitted bit or bit stream to a returned bit or bit stream is described, in which the comparison is performed primarily as a logical operation, or other high speed comparison, and the output of the operation is a binary representation of the round trip time of the bit or bit stream.

BACKGROUND OF THE DISCLOSURE

There are many applications that require the determination of the time for a digital bit or bit stream to traverse a round-trip path from a source transceiver to a destination transceiver and back. Such determinations are helpful for example, for sensing the proximity of one object having one transceiver attached to it relative to another object having the other transceiver attached to it. Application areas include, but are not limited to, distance measurement, indoor positioning, emergency location, search and rescue, personnel accountability systems, security systems, collision warning, adaptive cruise control, intelligent transportation systems, logistics, robotics, network analysis, communication channel characterization, and others.

SUMMARY OF THE DISCLOSURE

The present disclosure is directed to a system for and method of determining the time required for a digital bit or bit stream to traverse a round-trip path from a source transceiver to a destination transceiver and back. The path may also include multiple destinations, as, for example, in a 'multi-hop', mesh, or an ad-hoc transmission protocol, or other transmission protocol. For the purposes of disclosing the system and method, a round trip will be assumed to be from a source transmitter to a particular destination and back to the source. However, the system and method may be applied for round-trip delay measurements with any number of intermediate points.

One central feature or aspect of the disclosed system and method is a high speed comparison of the transmitted bit or bit stream to the return bit or bit stream. Measurement error sources, such as fixed delays or jitter introduced by circuit components, are to a significant extent measured in real-time and used to correct the measurement during the process.

The disclosure further includes an improved system for and method of determining the angular position of a transceiver with respect to other transceivers by taking the distance measurements from a first and second transceiver and comparing them to the distance measurements obtained from at least one other (third) transceiver.

The disclosure further includes a system for and method of interconnecting the transceivers to form a wireless communication network and coordinating the individual transceiver measurement and communication tasks through the network. Such coordination allows a large number of transceivers to operate in a given area, without the communication conflicts that would typically arise in such situations. The network can also be used to continually refine the accuracy of the measurements (distance and angular position), using a system and/or method disclosed in this application.

BRIEF DESCRIPTION OF THE DRAWINGS

The foregoing summarized system and method of the disclosure, the various features thereof, as well as the invention itself may be more fully understood from the following description when read together with the accompanying drawings:

FIG. 6 is an exemplary table illustrating the corrected (processed) output in the presence of jitter.

DETAILED DESCRIPTION OF THE DRAWINGS

Figure 1:
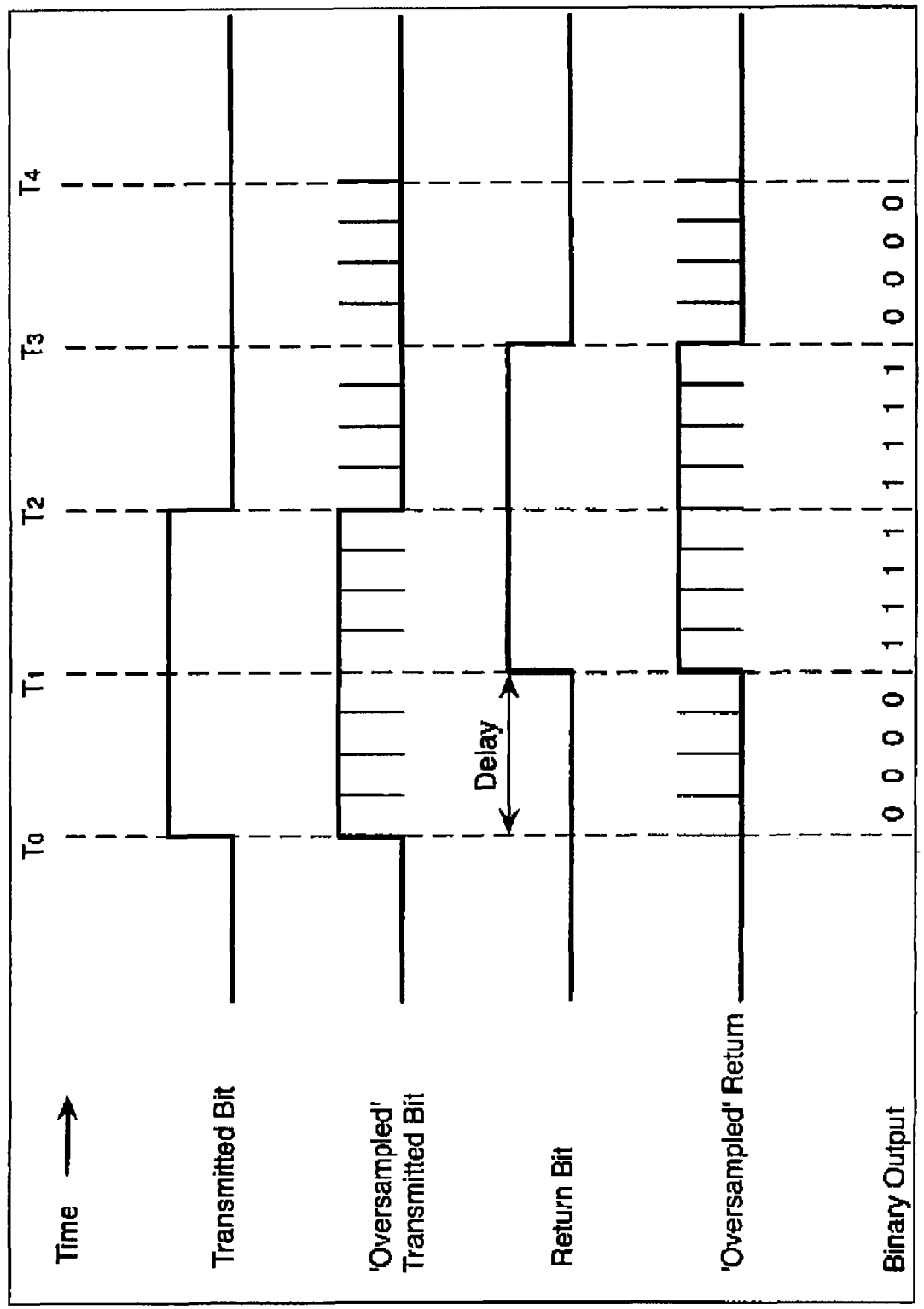
FIG. 1 is a graphical representation illustrating an example of a logical comparison of a transmitted and returned digital signal and the resulting binary output representing the delay.

The present disclosure relates generally to a system for and method of determining the delay time (or transit time, or propagation delay) of a digital signal transmitted from a source and returned to that source, regardless of the transmission medium. More specifically, a system for and method of comparing a transmitted bit or bit stream to a returned bit or bit stream is described, in which the comparison is performed primarily as a logical operation, or other high speed comparison, and the output of the operation is a binary representation of the round trip time of the bit or bit stream. In accordance with one aspect of the disclosure, the system and method described is preferably asynchronous so that clock synchronization between the signal source and destination(s) is not necessary to obtain the measurement. Furthermore, in accordance with another aspect of the disclosure, a system and method are presented which include a nesting of bit streams within longer bit streams to allow the delay measurements to be made across several orders of magnitude in time. This permits increasing the precision of the measurements, without a corresponding increase in the time required for processing the signal over many samples, as is done in many prior art systems. Systems and methods are also disclosed which allow a plurality of transceivers to exchange distance measurements to determine the angular position of the transceivers relative to each other.

In accordance with one aspect of the present invention, a method and system are disclosed that are distinct from the prior art, in particular with regard to RADAR systems. The disclosed system and method assumes that the 'target' is a "cooperative" one, and has compatible transceiver circuitry that provides an active response. RADAR systems typically rely on reflected energy from the targets, which are generally not "cooperative", especially those at very close range where measurements are more difficult. This is an important aspect of the present disclosure, as the cooperative transceivers described herein are intended to enable communication between objects, vehicles, or living things, such as exchange of identification numbers, descriptive data, warnings, and other information. Such communication will serve many useful purposes, which RADAR systems alone cannot achieve. Furthermore, the disclosed system and method do not assume a radar system as a source transceiver, nor do they demand the complex receiver electronics and signal processing required in RADAR systems. Thus, the present disclosure is applicable as a geo-locating system for and method of using any transceiver type and any modulation/demodulation scheme, whether based on radio, other electromagnetic waves, or other wave propagation phenomena. It is also applicable as a system for and method of characterizing the delay of a digital signal as it passes through any communication path, or through multiple communication paths, over, for example, wires, fiber optic-cables, bulk solids, liquids, gases, and so on. The application areas of the method and system are thus very wide ranging, and go well beyond the scope of RADAR or similar systems.

The disclosed method and system is also distinct from the prior art with regard to Radio Frequency Identification (RFID) systems, and Real-Time Locating Systems (RTLS). RFID systems typically make use of multiple transceivers, but are limited to one transceiver (a Reader) determining if any target transceivers (tags) are present, and reading the data encoded within them. They perform a presence detection and identification function, but do not obtain genuine distance information. Real-Time Locating Systems, on the other hand, are designed to provide distance and azimuth information (localization) for a large number of transceivers, in addition to identification information. However, prior art RTLS systems have significant limitations, which the disclosed system addresses. For example, the Global Positioning System (GPS) provides three-dimensional localization of suitably equipped transceivers, but requires processing of data received from at least three orbiting GPS satellites. Applications where satellite visibility is poor or unavailable, such as indoors, in underground mines, etc., cannot make use of GPS directly. Other RTLS systems, especially those designed for use indoors, utilize infrared, ultrasound, and wireless communications protocols (e.g. IEEE 802.11x), often in combination, but are limited either by the requirement for line-of-sight communication, signal processing complexity resulting in slow performance, high system cost, inadequate spatial resolution, or a combination of these limitations. By providing digital signal delay information rapidly and inexpensively, and utilizing signal detection and comparison systems and methods that can operate independently of the particular transmission medium, method or protocol, the disclosed system and method addresses these limitations.

Embodiments of the disclosed system and method will typically include the use of at least two transceivers and a minimal number of peripheral components, such as power sources, antennas or other transmission media interfaces, visual and audible indicators or alarms, user controls, etc. Transceivers may be mobile or fixed, and powered externally or with internal power sources such as batteries. Owing to the simplicity of the approach, the transceivers may be small, battery powered, and made compatible with various packaging methods suitable for wearing by humans or animals. They may also be mounted to vehicles, machines, structures, shipping containers, pallets, and product packaging. For the illustrative purposes of describing the system and method, transceivers will be referred to as 'source transceivers' or 'destination transceivers' with the 'source transceiver' being the device initiating the measurement, and the "destination transceiver" receiving the initiating measurement signal from the "source transceiver". However, any given device might perform either function at a given time.

The source transceivers produce interrogation signals, to which the destination transceivers respond. The source transceivers can measure the time taken for a digital signal to traverse from the source transceiver to the destination, and back again. One aspect of the basic method and system is illustrated in FIG. 1. The source transmitter generates a bit or bit stream, indicated in the drawing as Transmitted Bit, at time $T_0=0$. The period of the Transmitted Bit is $T_2$ seconds long (the time T will be measured in convenient units, such a milliseconds, microseconds, nanoseconds, etc.). The signal will travel to the destination transceiver where it is re-transmitted, and finally returned to the source transceiver, as the Return Bit. There will be a time delay of $T_1$ seconds between the departure time of the original signal and the arrival time of the return signal, and this delay time is related to the distance the signal traveled, the propagation speed through the transmission medium, and the propagation speed of the signal through the transceiver components. $T_1$ may be larger or smaller than $T_2$, though in the figure it is shown for illustrative purposes as smaller since these measurements, with methods and systems found in the prior art, are typically the most difficult to make. In cases where a signal passes through a number of intermediate transceivers, which may re-transmit the signal through different media (e.g., water, air, building materials), the propagation speed in each medium must be known for each leg of the transmission path (electromagnetic, ultrasonic, infrared, acoustic, etc.).

THE 'High Speed COMPARISON' FUNCTION

A central element of the present disclosure is the use of a high speed comparison circuit to detect the departure and arrival times of the signal bit or bit streams. This circuit may be composed of logic gates, or combinations thereof, including counters, timers, and other components commonly used in high speed digital processing, but may also consist of analog or mixed-signal components such as sample-and-hold circuits, analog-to-digital converters, edge detection circuits, and the like. The primary function of the circuit, regardless of the implementation, is to perform a comparison of the transmitted and received signals, the output of which is a value proportional to their relative separation in time.

As shown in FIG. 1 the departure time is indicated at $T_0$, while the arrival time is $T_1$. Referring again to FIG. 1, the return signal arrives with some unknown delay (indicated as $T_1$-$T_0$ in FIG. 1). While the transmitted bit is generated with a certain time base, or clock frequency, the return bit is interpreted by a circuit with a clock frequency substantially higher that the transmit clock. In the figure, the return bit is evaluated, or 'over-sampled' at, for example, 8 times the clock frequency of the transmitted bit. That is, in the example given each transmitted bit of length $T_2$ ($T_2$-$T_0$ with $T_0$=0) produces eight return bits of length $T_2/8$ for each bit transmitted. In general the duration of the bits produced in the comparison circuit is LB=$T_2$/S, where S is defined as the over-sampling factor, and is also equal to the number of bits into which the return bit is divided, or S=$T_2$/LB. Other ratios can be implemented (e.g., S=16 or S=32), as can systems with varying values of transmitted bit length, with obvious tradeoffs, for example, for complexity, measurement resolution, circuit cost, and so on.

In a typical implementation, the transmitted bit and the return bit will both be sampled at a multiple of the transmit clock frequency, and the resulting outputs compared using high speed logical comparison configurations, such as high speed logical gates, e.g., XOR, OR, AND, or their equivalents, so that the results can be provided in substantially real time. Other implementations of high speed comparison configurations can be designed using, for example, edge detection circuits, timers, counters, sample-and-hold circuits, analog-to-digital converters, or a combination of these elements. Generally these components can be operated at much higher frequencies than the transceiver processors, and can be obtained at much lower cost, thus the system has advantages over systems that require more intensive signal processing.

Figure 2:
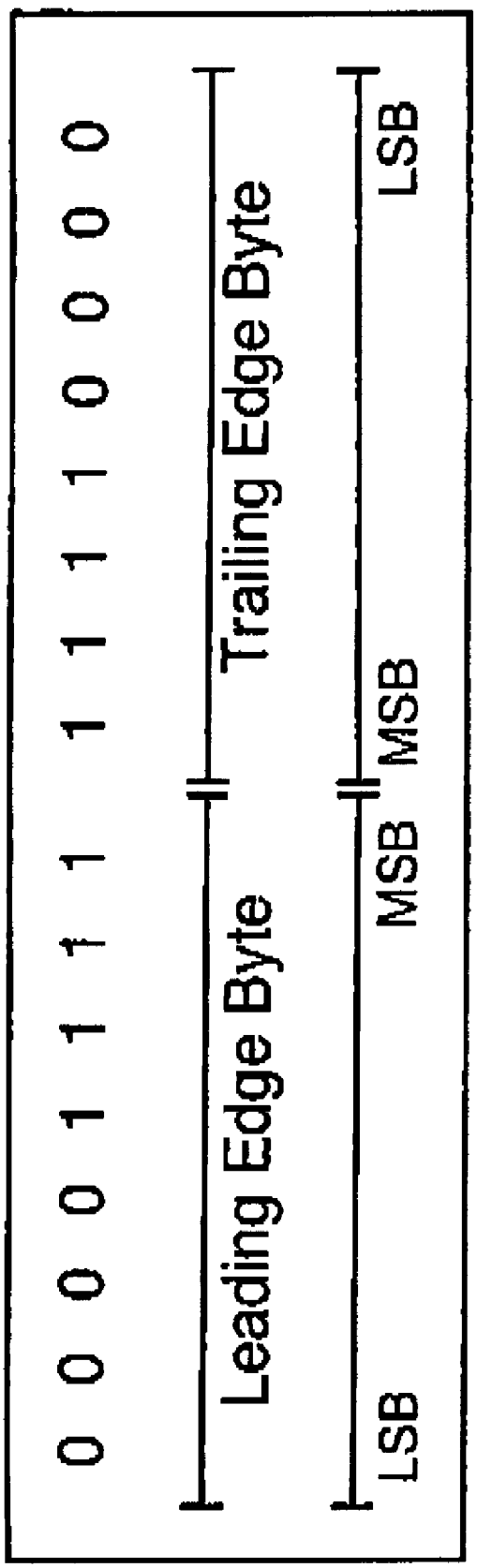
FIG. 2 is a graphical representation illustrating an example of a preferred method of interpreting the binary output bits.

In the present disclosed system and method, the binary output bits resulting from the over-sampling of the return bit are interpreted as bytes. As illustrated in FIG. 2, the Oversampled Return digital signal of FIG. 1 is represented as a digital signal having two 8-bit bytes, since the transmit bit is, in the example given, over-sampled by a factor of eight (S=8). The first byte corresponds to the time period during which the leading edge of the Return Bit arrives, and the second byte corresponds to the time period during which the trailing edge of the Return Bit arrives. If the transmit bit were over-sampled by 16, there would be four 8-bit bytes, and a corresponding increase in the temporal resolution of the measurement. Generally, the duration of Leading Edge (LE) and Trailing Edge (TE) time periods will vary from one implementation to another, depending on transmit bit or bit stream length and the delay times anticipated for the measurement.

Note that, as best seen in FIG. 2, the disclosed system and method arbitrarily assign the least significant bit (LSB) position to the first time slot in the leading edge byte of the Oversampled Return, while the most significant bit (MSB) is assigned to the last time slot. This is reversed for the trailing edge byte of the Return Bit, as this choice simplifies the calculations that follow. Depending on the designers' preference, LSB and MSB for each byte can be reversed or not, since the bytes ultimately will carry the same information, albeit transformed mathematically. A novel and important aspect of the present invention is that both the leading and trailing edges of the Return Bit are detected independently, providing two measurements of the arrival time of the return bit, or each bit in the return bit stream. These two measurements can be processed, compared, and otherwise evaluated in numerous ways. An example of one such evaluation, providing a measurement method with noise reduction, is given below.

In one embodiment, the binary output is produced by the application of the logical OR and "Exclusive OR" (or XOR) functions to the return and transmitted bytes, as disclosed by way of example, in the following paragraphs. Various decimal and binary representations of the output, including the number of bits in a byte representing the delay, can be used in the process, with suitable conversion or mathematical transformation from one to the other. In any case, the output will be converted into a delay measurement available for practical use. To accomplish this, it is necessary to convert the binary or decimal values to units of $T_2$/LB or bits. Bits are easily related to units of time, since each bit has a known duration related to the clock frequency of the logical comparison configuration. For example, in a system using a 1 GHz clock and 50% duty cycle to over-sample the return bits, one bit period equals 50% of the clock period, or 0.5 nanoseconds.

As discussed above, each comparison captures the departure of one bit (or bit stream) and the arrival of another, and over-samples the bit by a factor S. In each case, both the leading edge (LE) and trailing edge (TE) of each received bit are compared to the transmitted bit pattern or to other known values. Two measurements are thus generated per return bit, which take the form of two digital bytes of S bits each. The assignment of least significant bit (LSB) and most significant bit (MSB) is arbitrary, but for the purposes of disclosing the method, in the illustrated example it is assumed that the LSB arrives first for the LE byte and the MSB arrives first for the TE byte, as shown in FIG. 2.

Measurement of Signal Delay with Noise Reduction Method

Typically, the output of the comparison will be in binary form, since the delay is represented by a group of bits. Referring again to FIG. 1, the Return Bit will have a leading edge that arrives at time $T_1$, and a trailing edge that arrives at time $T_3$. Ideally, the duration of the return bit would be a known quantity, $T_2$=$T_3$−$T_1$, but in practice there are noise sources which introduce arrival time variations in both the leading and trailing edges of the bit. This noise, often referred to as jitter or phase noise, can have the effect of shortening or lengthening the bit, or of making the arrival time appear to vary, or both. Jitter will generally be present regardless of the design of the transceivers, the choice of transmission medium, or other factors under the designer's control.

To address this problem, one aspect of the disclosed system and method combines the logical comparison method and a novel interpretation of the binary output, as illustrated in FIG. 2, with a novel method of reducing the effects of noise in the signals.

Figure 3:
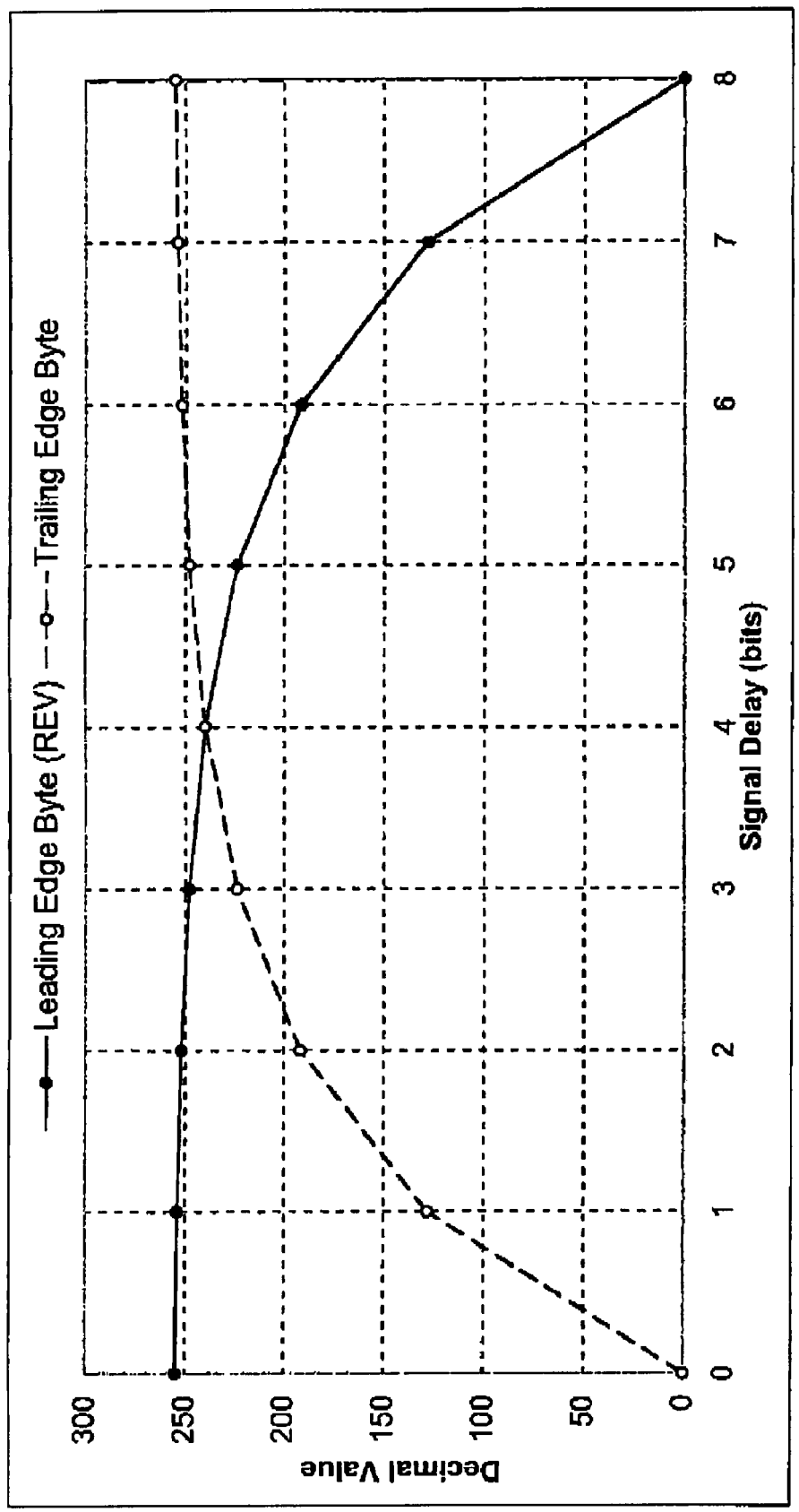
FIG. 3 is a graphical representation showing a plot of the output values of the leading edge byte and trailing edge byte as a function of signal delay time.

FIG. 3 shows the values of the leading and trailing edge bytes (converted into their decimal equivalents) as a function of the signal delay, given in bits, or units of $T_2$/LB. For example, with a delay of only one bit, the binary value of the leading edge byte will be 0111 1111 (LSB to MSB). The binary value of the trailing edge byte will be 1000 0000 (MSB to LSB). The values represented by these bytes, when converted to the decimal system, are $LE_{DEC}$=254 and $TE_{DEC}$=128, respectively. Here, each 8-bit word has 256 allowable values, ranging from 0 to 255. The graph of FIG. 3 plots the values of the bytes as the delay increases, and they are seen to have the expected base-2 logarithmic shape.

Figure 4:
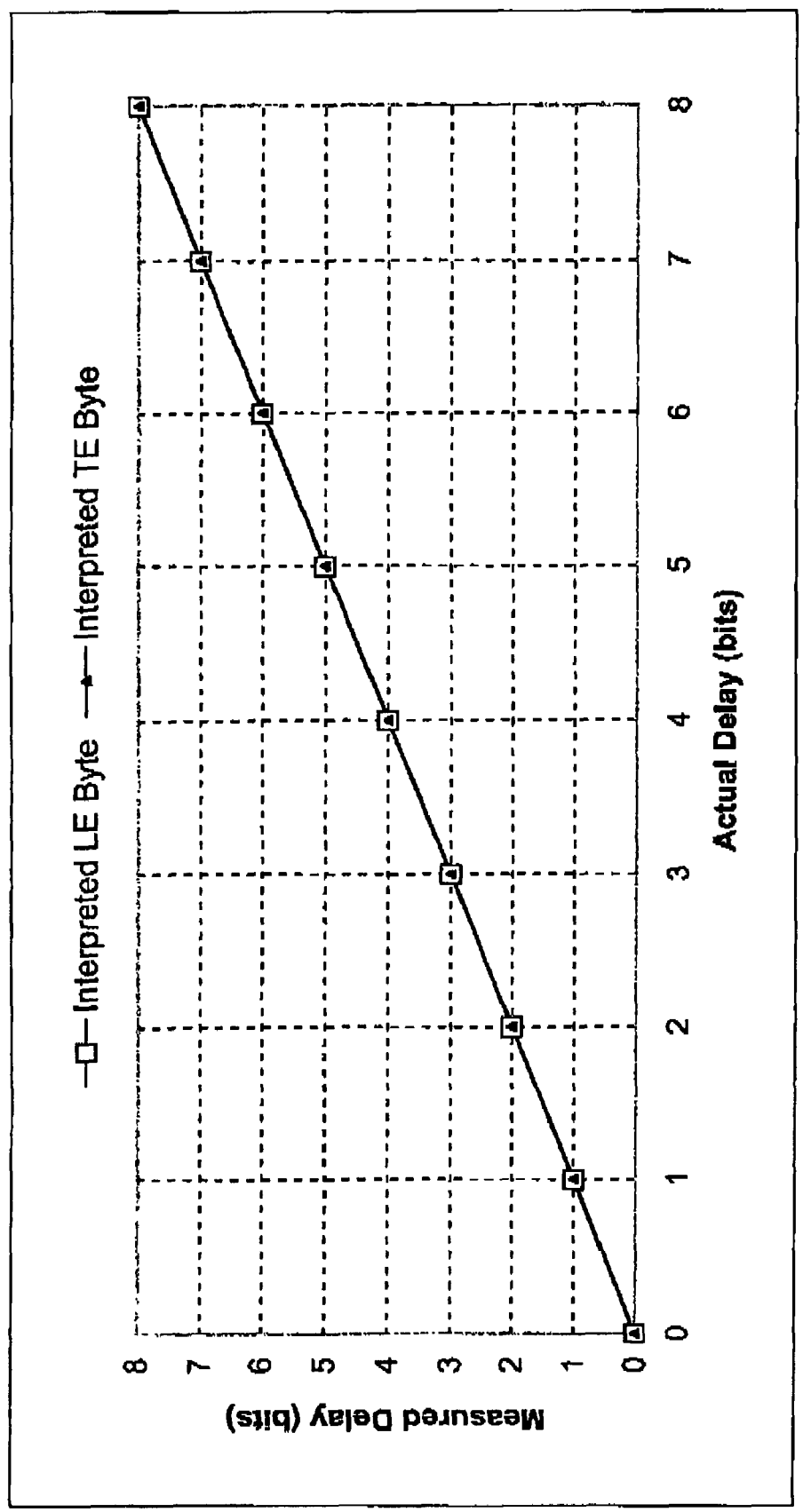
FIG. 4 is a graphical representation showing a plot comparing measured versus actual delay values for the leading and trailing edge bytes, as interpreted using the method of the invention, in an ideal (noise-free) case.
Figure 5:
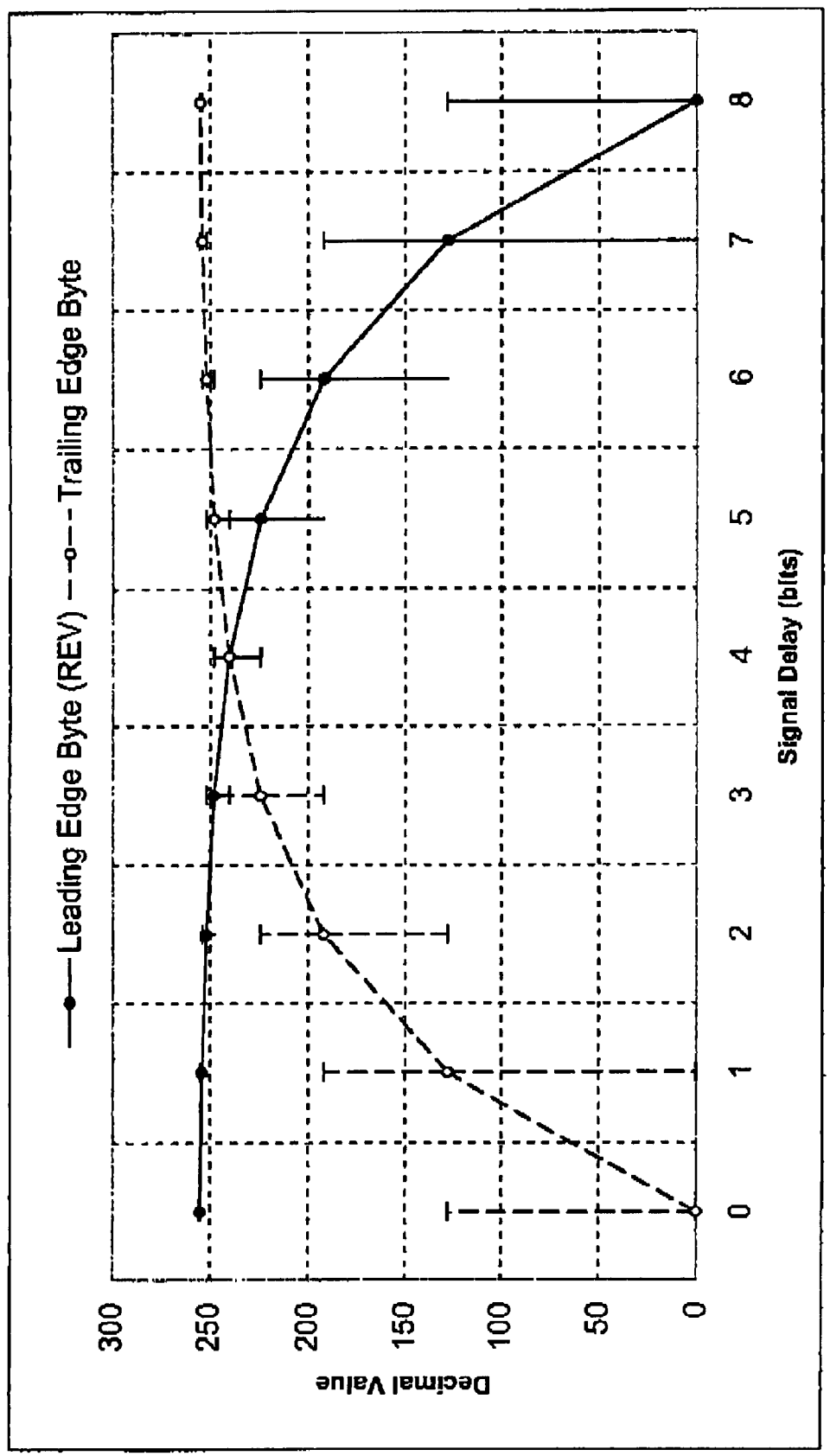
FIG. 5 is a graphical representation illustrating the effects of jitter on the binary output values.

For methods and systems that do not need to operate in the presence of significant noise, a simple counting of binary output bits, or their decimal equivalents, may suffice. FIG. 4 illustrates the results when the LE and TE bytes are converted from decimal values into bits in the absence of noise, and how these measured values correspond directly to the actual signal delay. However, for practical methods and systems, phase noise in the return signal can present significant problems, and is a major reason that prior art tends to avoid reliance on simple rising- or falling-edge timing to determine signal delays. The effects can be seen readily in FIG. 5, which shows an example of the decimal values of leading edge and trailing edge bytes, with a single bit of 'noise' added to each. The noise manifests itself as an increase or decrease in the binary output value, and the magnitude of the increase or decrease varies depending on the 'significance' of the bit representing the delay. This depends on the actual delay time of the signal, so that the noise level at the output is a function of the signal delay as well as the variation in arrival times of the edges.

FIG. 6 shows an example table of values (in binary and decimal forms) of the LE and TE bytes as the noise levels and actual signal delay vary. The variation of the value of the LE byte is a measure of the delay of the leading edge of the bit, plus variations in the LE arrival time due to phase noise. Similarly, the variation of the value of the TE byte is a measure of the delay of the trailing edge of the bit, plus variations due to phase noise. For simplicity in the table, actual delays have been applied to both edges, and out-of-phase noise has been added to only the LE byte, but the method effectively sums the LE and TE bytes, so that the effect in the output would be no different even if noise were added randomly to both edges.

Jitter, or phase noise, can be thought of as having two components. The first is an in-phase component, which either delays or advances both the leading and trailing edges of the bit. This appears as either increased or decreased delay of the entire bit, and is difficult to distinguish from actual signal delay unless averaged over time or viewed in the frequency domain, to allow only those variations that correlate with known physical limitations of the transceivers and the change of their relative positions in time. The second is an out-of-phase component, which affects one edge with respect to the other, and appears as an increase or decrease of the duration of the return bit. Prior art methods which attempt to observe either the leading or trailing edge of received bits are limited by the effects of both these noise components. As disclosed below, in accordance with one aspect of the present invention, a system for and method of substantially removing the out-of-phase component is provided.

For illustrative purposes, the logical inverse of the LE byte is also listed in FIG. 6 (denoted by /LE), since in the absence of noise this term will be identical to the TE byte. In fact, the difference between /LE and TE is a measure of the variation of pulse width in the signal, compared with the transmitted bit (in other words, the out-of-phase noise component).

Applying the logical function "Exclusive OR" (XOR) to each byte and its full scale value (all ones in binary, or $2^S$ in decimal), in a bit-by-bit fashion, results in values that can be used by the circuitry to subtract the out-of-phase noise from the measured signals. The XOR function is applied to the LE byte and $2^S$, and again to the TE byte and $2^S$, and the results are given the following physical interpretations:

$$/LE'_{BIN}=XOR\{2^S_{BIN}, LE\}=LE\ delay+noise$$

$$TE'_{BIN}=XOR\{2^S_{BIN}, /TE\}=TE\ delay+noise$$

The sum of these terms is proportional to the out-of-phase noise on both edges plus two times the signal of interest, and is defined as:

$$Sum_{TE/LE}=OR\{/LE'_{BIN}, TE'_{BIN}\}$$

Note that the highest speed implementations of the system and method will likely use a high speed comparison configuration, such as logic gates that are devoted to this and other logical operations, rather than using general purpose processors. For purposes of disclosure of the method and system, the decimal values are shown in FIG. 6 along with the binary values, and then are converted into bits for the remaining calculations. The decimal values are converted into bits according to the following relations:

$$/LE'_{BITS}=LOG_2\{2^S-LE_{DECIMAL}\}$$

$$TE'_{BITS}=LOG_2\{2^S-/TE_{DECIMAL}\}$$

$$Sum_{BITS}=LOG_2\{/LE_{DECIMAL}+TE_{DECIMAL}+1\}$$

Since $Sum_{BITS}$ (and equivalently $Sum_{TE/LE}$) represent the signal-plus-noise in two measurements, the following represents the average signal plus total noise level over two measurements:

$$AVG_{TE/LE}=\frac{1}{2}\times Sum_{BITS}$$

Thus, the desired measurement is completed by taking the sum $$OUTPUT=/LE'_{BITS}+TE'_{BITS}-AVG_{TE/LE}$$

and rounding up any fractional remainder to the nearest whole number, as shown in FIG. 6. In this expression, the total noise level and the average signal level are both subtracted from the sum of the raw measurements, resulting in a substantial reduction in noise levels in the output. It will be seen that any number of samples of /LE and TE may be taken (and processed in similar ways) to improve the measurement accuracy. Further, various techniques, such as averaging the multiple samples, where appropriate, can further improve accuracy.

It is apparent that the discrete nature of the output lends itself to the many systems for and techniques of signal processing and interpolation available in current electronic and computing systems. An advantage of the present invention is that these systems and techniques may be applied more easily than in other prior art methods and systems since in most cases the binary output will be generated very quickly, while the output data will be sampled or otherwise read by the system at a much slower rate. This allows tens or hundreds of clock cycles for signal processing (averaging, interpolation, transforms, etc.) for each output measurement provided by the comparison circuit. For example, an automotive collision warning system using the present method might require only 100 nanoseconds to make enough distance measurements to determine a highly accurate average value, yet the vehicle may require the value to be presented to the control system only once every millisecond. Thus, in accordance with one aspect of the present system and method would require a significantly small portion, e.g., only 0.01%, of the control system's processing time to provide the measurement, while the rest may be used for other purposes.

Nested Bit Patterns

In accordance with one aspect of the invention, a novel method (and system employing the method) is proposed in which a bit stream, or pattern of bits, is 'nested' within a longer pattern of bits, which itself is nested within a longer pattern of bits, etc. The concept of this aspect of the invention is illustrated by way of example in FIG. 7. The application of this concept to the system for and method of signal delay measurement disclosed herein greatly enhances the ability of the method of measuring delays that span several orders of magnitude in time. For instance, an automobile cruise control system measuring the distance to another vehicle may need to measure distances of several thousand feet to operate safely at highway speeds. The same system, however, may need to measure accurately at distances as small as one foot in parking or other low speed situations. For many prior art systems, the requirement to perform over three orders of magnitude in distance is a significant challenge.

The method of nested bit patterns is described as follows. Referring to FIG. 7a, a bit sequence is shown which represents the shortest duration measurements to be made, or $T_2=SL_B$. A repeated pattern of this bit sequence is generated, and on a longer time scale appears as shown in FIG. 7b. This sequence is also repeatedly generated, and on an even longer time scale appears as shown in FIG. 7c, and once more in FIG. 7d. This process may be repeated indefinitely, until the time scale matches the desired upper bound of delays to be measured, or $T_S$. While the figure shows 'nesting' to three orders of magnitude, where $T_2=T_S/10,000$, even higher levels of nesting are achievable.

Figure 7:
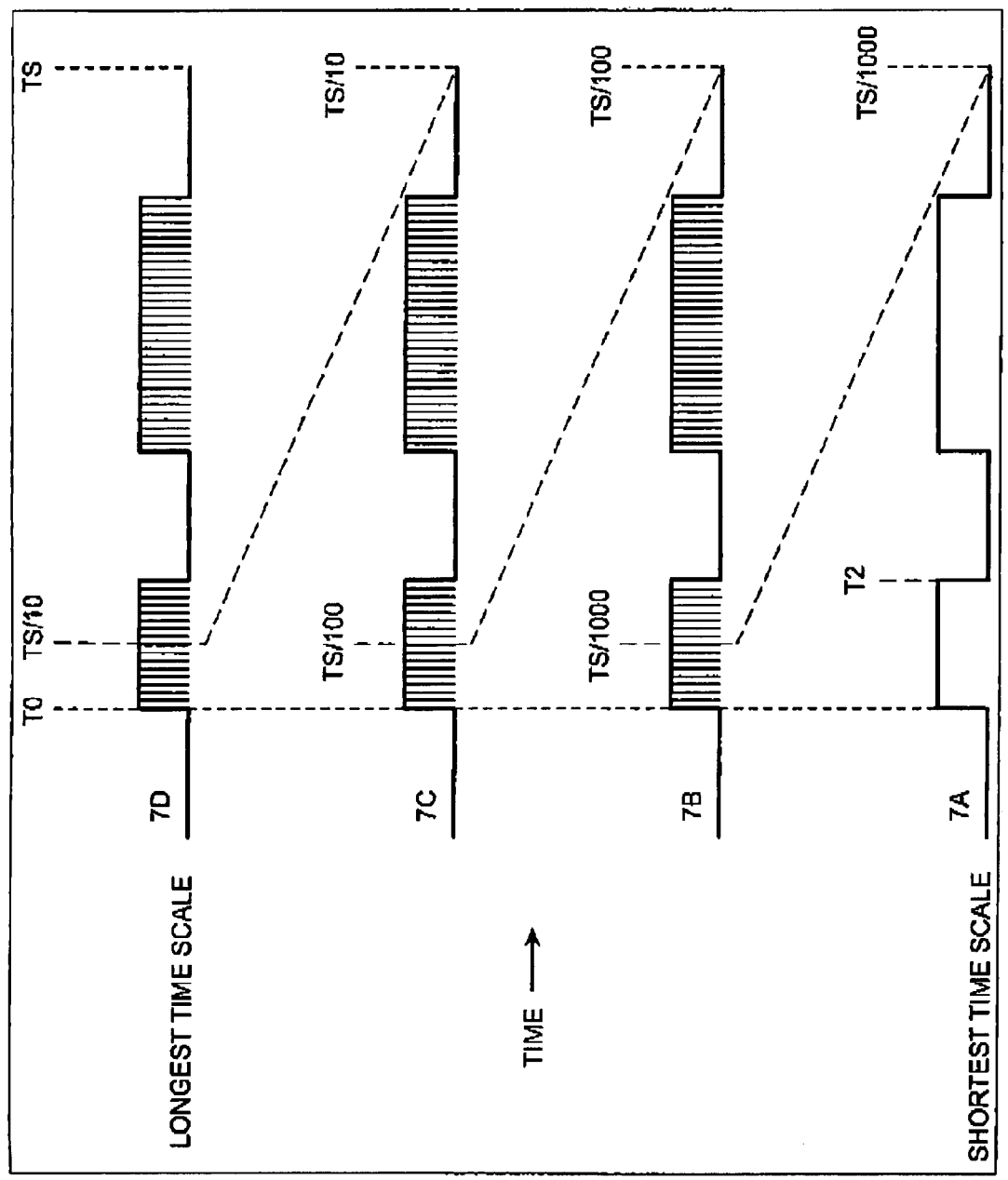
FIG. 7 is a graphical representation illustrating the method of nested bit patterns.

The interpretation of the nested bit patterns is substantially the same as for a normal bit pattern, except that the clock speeds are scaled accordingly for each iteration. In FIG. 7, the transmitted bit length $T_2$ is arbitrarily set to be one-tenth of the shortest time scale of interest. The time scale for FIG. 7a is $T_S/1000$, requiring logical comparison configuration circuitry which can capture return bits of length $T_2/S=T_S/10000$ or shorter. The time scales for the example in FIGS. 7b, 7c, and 7d are $T_S/100$, $T_S/10$, and $T_S/$, respectively, but in practical systems may be shorter or longer. Some smoothing, or time-averaging, of the longer time scale bit streams may be necessary to accurately capture the signal envelope, but may be performed in ways which are well known to those skilled in the arts.

Use of this novel approach enables the delay time measurement of the present invention to be made across several orders of magnitude at the same time. That is, it will be apparent to those skilled in the arts that the logical comparison configuration can include multitude of comparison circuits or configurations, operating in parallel, but at different clock speeds, can produce a delay time measurement with an extremely broad dynamic range. Importantly, in accordance with one aspect of the invention, the length of time the system and method requires to take a measurement across the full dynamic range is proportional to the longest time scale used, and increased precision does not require longer time periods for the averaging of a large number of bits. Instead, the precision comes from the interpretation of the nested bit streams already contained within the longer stream, which does not take any additional time.

Hardware Implementations

The following paragraphs describe several preferred embodiments of the systems for accomplishing the foregoing. Others may be readily created by those skilled in the arts.

Figure 8:
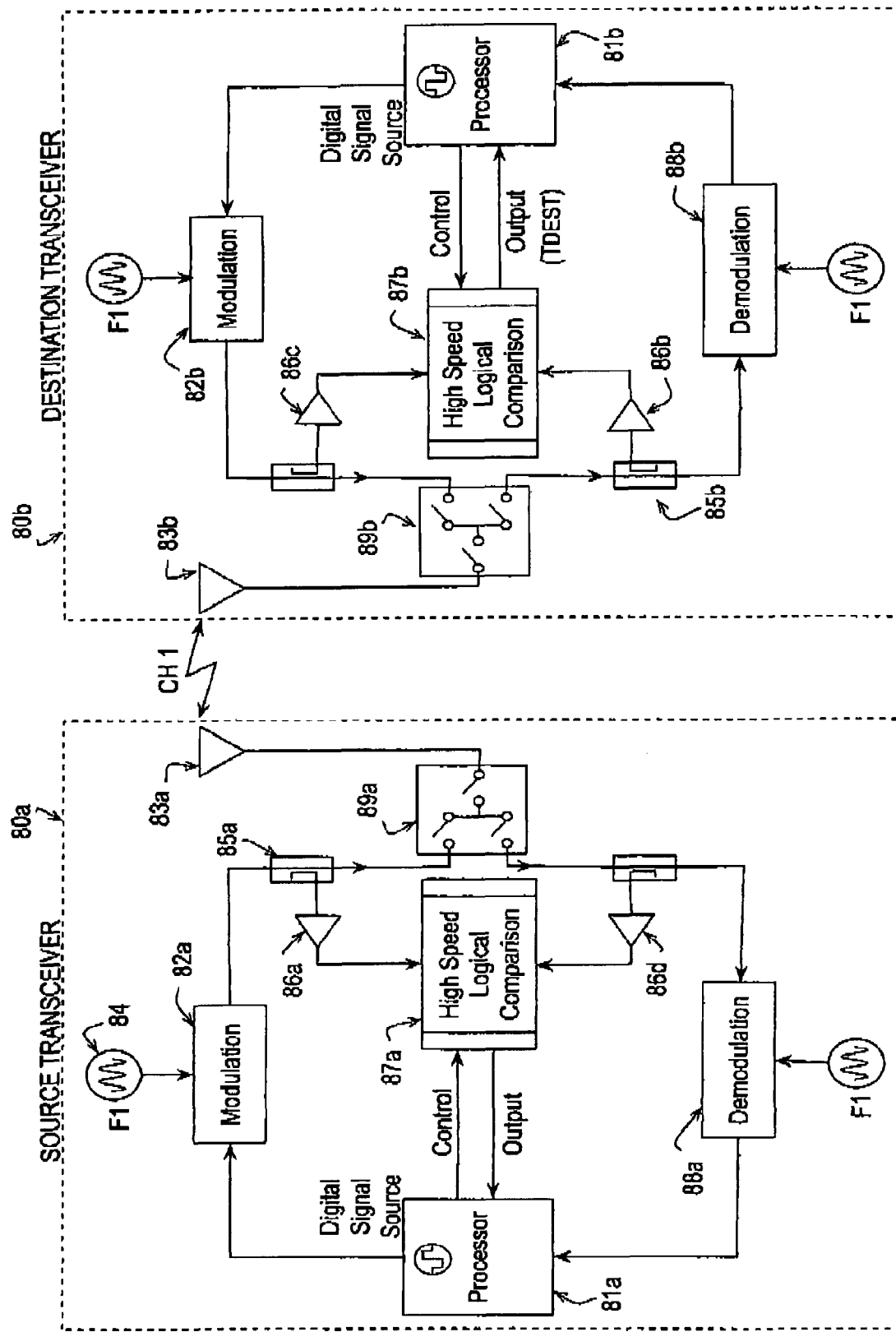
FIG. 8 is a schematic block diagram showing two identical transceivers, both operating on the same communication frequency (simplex).

FIG. 8 shows a transceiver pair 80a and 80b in communication with each other according to the present invention. In this embodiment, the devices are substantially the same.

Signal generation in the source transceiver is initiated by a local processor 81a, and is followed by modulation using the modulation unit 82a and transmission of the signal from antenna 83a through the transmission medium, represented by the signal channel "CH1". The transmitted signal will typically be composed of a carrier frequency (or frequencies), provided for example by the source of the carrier signal indicated at 84, upon which is modulated (by unit 82a) the original digital signal. In some cases, the carrier will only be present when the signal is present (for example, On-Off-Key modulation, or OOK), or it may be present continuously in forms corresponding to other modulation techniques, such as amplitude, frequency, pulse-code, or phase modulation. It may also be present intermittently, for example as in spread spectrum, CDMA, or other common modulation techniques.

A small part of the modulated source signal is sampled, or split from the output of the modulation section, and routed using a coupler/splitter unit 85a to a detector circuit 86a. The detector circuit may simply detect the presence of the carrier (s) as in OOK modulation, or it may perform a more complicated task, such as partial or complete demodulation to determine the actual beginning of the digital signal. In any case, the detection function produces a 'flag' signal, such as a digital bit rising edge followed after a known time by a falling edge. This flag marks the departure time of the outgoing bit or bit stream, whether that corresponds to the carrier departure time or not.

The detector circuit is followed by a high speed comparison circuit 87a preferably composed primarily of high-speed logical function blocks and gates. This circuit 87a performs the "comparison" function described above. The signal departure flag is held, or latched, in the logical comparison circuit for later use in the process.

The modulated signal travels to the destination, and is received by the destination transceiver (in the illustration shown, medium interface 83a to medium interface 83b, or vice versa), each medium interface being for example, an antenna, transducer, light source, etc. As before, part of the received signal is sampled, or split off, using coupler/splitter 85b and routed through a detector 86b to a circuit 87b of high-speed logical function blocks and gates substantially similar to that in the source transceiver. The signal arrival flag is latched, as before, and the signal is simultaneously routed to the demodulation section 88b. The demodulated signal can be processed by destination processor 81b to recover source transceiver commands and execute them accordingly, or to provide other functions. Importantly, this permits the method and system disclosed to function in conjunction with, and without significant additional resources to, industry standard communication protocols such as IEEE 802.11x, 802.15x, WiFi, GPOS, etc. The processor will generate a return signal, which may be identical to the original or it may be changed to include information to be transmitted back to the source transceiver. A switching unit is provided at 89a and 89b for switching between the modulation and demodulation modes of operation depending on whether the transceiver is transmitting (where the switching unit is set for modulation), or receiving signals (where the switching unit is set for demodulation) over the communication channel CH1.

It should be noted that for the purposes of measurement accuracy, the delay introduced by the destination processor might be large compared to the round trip transit time to be measured. Processing should therefore be designed to minimize the time taken to generate the response, and to do so in a predictable manner. One solution to this problem is to require an arbitration process for granting the transceivers permission to transmit on CH1. Once arbitration is complete, the source transceiver can transmit a short burst of data to the destination transceiver, and this burst is used for the comparison. Processing time at the destination transceiver can be minimized in this case.

The return signal generated by destination processor 81b is modulated by modulation unit 82b onto the carrier frequency, and routed to the medium interface 83b. The departure flag of the return signal produced by detector 86c is latched into the logical comparison circuit 87b. At this point, the logical comparison circuit in the destination transceiver will have obtained two time flags, and can logically compare them according to the method described previously to produce an output which is readable by the destination processor. The output (denoted $T_{DEST}$), corresponds to the propagation time of the signal through the components of the destination transceiver, and thus indicates the delay error the destination transceiver introduces. This data can be transmitted back to the source (following the initial return signal) for use by the source transceiver in removing errors from the measurement.

The modulated return signal travels back to the source over CH1 and is received by the source transceiver 80a. Once again, part of the received signal is sampled, or split off, and routed to the detector 86d and logical comparison circuit 87a. The signal arrival flag is latched into the logical comparison circuit 87a, and the signal is simultaneously routed to the demodulation section 88a. The source transceiver logical comparison circuit 87a now has two time flags, and can compare them to produce an output which is readable by the source processor 81a. In this case, the output (denoted $T_{TOT}$) corresponds to the propagation time of the signal through the transmission medium interfaces, the transmission medium (there and back), and the components of the destination transceiver.

One final measurement is needed, which can typically be generated in advance and stored in the source processor's memory, to be updated at regular intervals. A signal is generated by the source transceiver, and modulated as before. However, this 'self-test' signal is immediately routed from the modulation section 82a through switching unit 89a to the demodulation section 88a (the path may include the medium interface(s) if these components introduce substantial errors). As before, the difference between departure and arrival times of the self-test signal, as determined by the logical comparison circuit, is read by the source processor 81a. This measurement, denoted $T_{SOURCE}$, corresponds to the propagation time of the signal through the source transceiver components.

Thus, the total propagation time of the signal to the destination transceiver and back ($T_{TOT}$) is composed of three elements:

$$T_{TOT} = T_{SOURCE} + 2T_{MEDIUM} + T_{DEST}$$

$T_{TOT}$, $T_{SOURCE}$ and $T_{DEST}$ have all been measured, as discussed above. Therefore, $T_{MEDIUM}$ can be calculated directly:

$$T_{MEDIUM} = \frac{1}{2}[T_{TOT} - T_{SOURCE} - T_{DEST}]$$

In this way, the invention can determine the propagation time of a digital signal as it makes a round trip from source transceiver, through a medium to a destination transceiver, and back. The time measurement can be directly converted to a distance measurement with standard techniques, if the speed of propagation of the signal is known for each medium the signal traverses.

Duplex Operation

The system of FIG. 8 uses one communications channel (CH1) for signals traveling back and forth. This can be referred to as 'simplex' operation, and is adequate for situations where the measured delay exceeds the duration of the transmitted bit or bit stream, as would be the case if $T_1$ were greater than $T_2$ in FIG. 1. However, in many applications this will not be the case. In fact, it is in the more demanding situations, where $T_2$ is greater than $T_1$, which one aspect of the present invention seeks to address.

Figure 9:
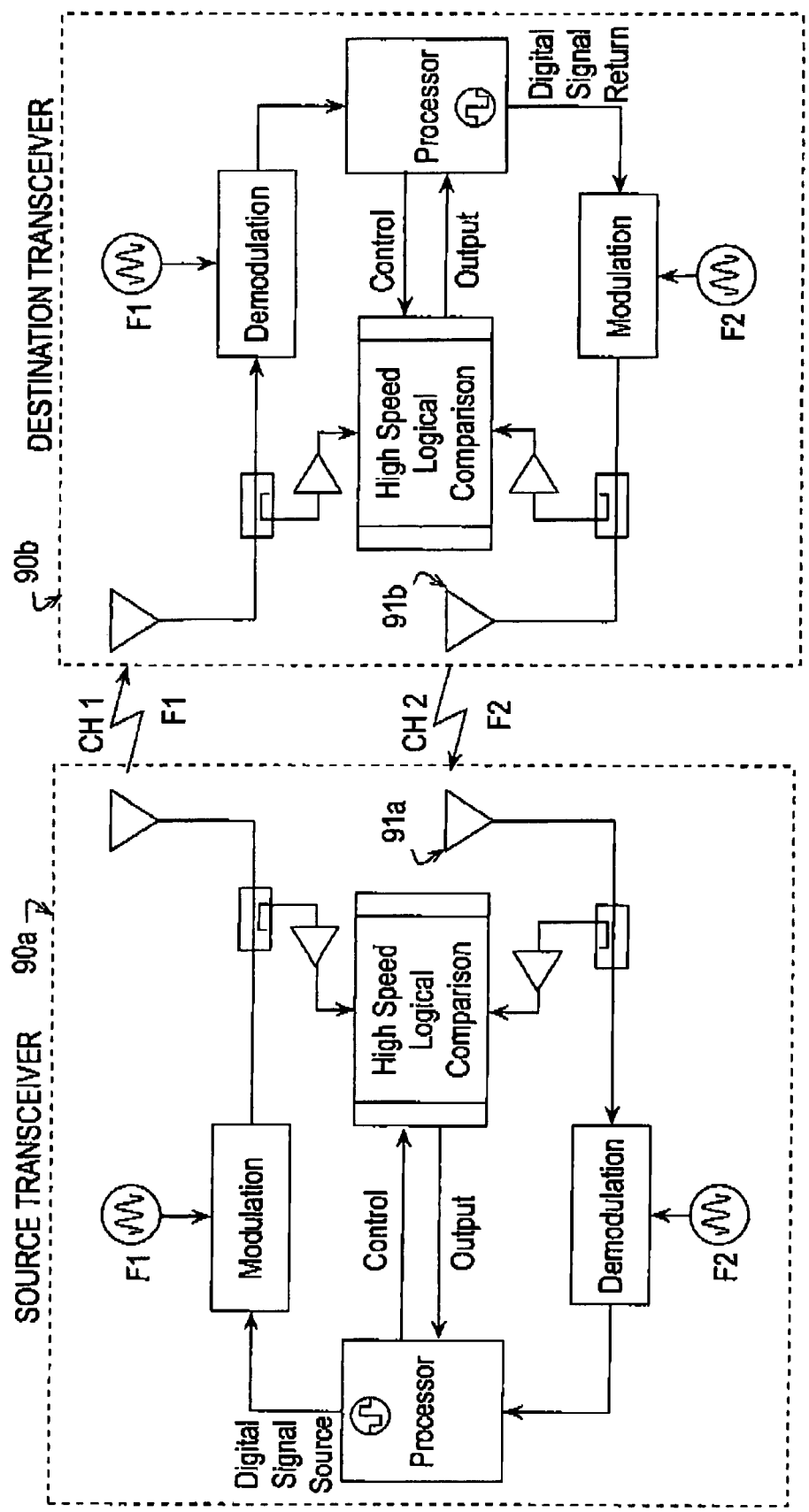
FIG. 9 is a schematic block diagram showing a transceiver pair using different frequencies for send and receive (duplex).

FIG. 9 shows an embodiment of the present invention, which uses separate communications channels, CH1 and CH2, for the transmitted and return signals, referred to as duplex operation.

In a manner substantially similar to that described above for simplex operation, the transmitted bit or bit stream is transmitted by the source, traverses the medium, is received at the destination, and returns through the medium to the source. At each stage, as before, the arrival and departure flags are latched by the logical comparison configured circuits, and the round trip delay time is measured. However, this embodiment makes use of channel CH1 for transmitting the initial signals from transceiver 90a to transceiver 90b, and additional interfaces 91a and 91b and a second channel CH2 for the return signals (as seen in FIG. 9). This eliminates the need for switching unit 89. This has the advantage of allowing the return signal to overlap the transmitted signal in time, so that a delay measurement can be made in a time period less than one bit length (i.e., less than T2). Thus, delays of arbitrarily short duration may be measured, with a suitable choice of the over-sampling factor, S.

Modulation/Demodulation Bypass and Error Correction

Figure 10:
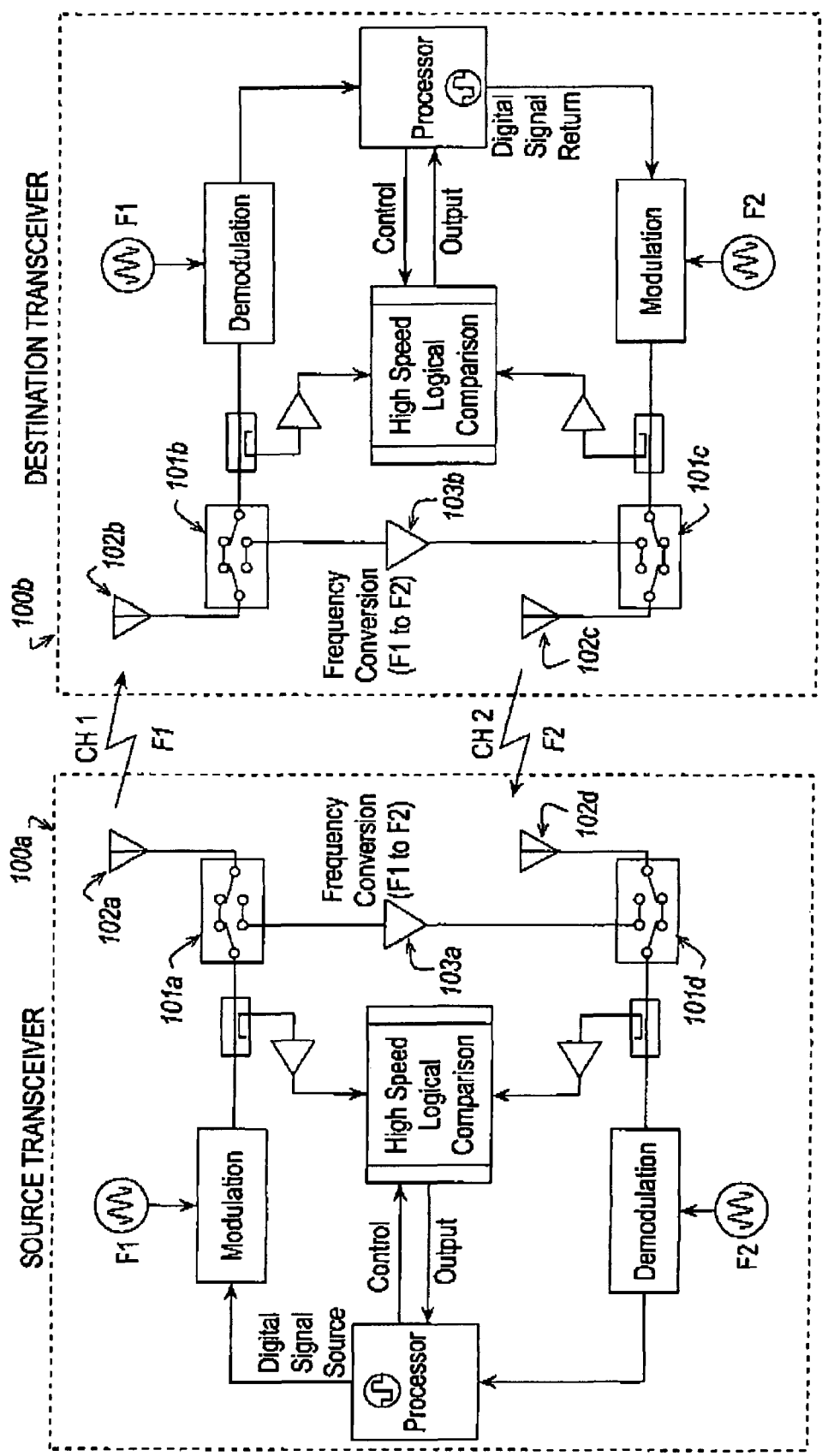
FIG. 10 is a schematic block diagram of a transceiver pair with modulation bypass, which permits near real-time measurement of delays introduced by components in the transceivers themselves.

FIG. 10 illustrates another embodiment of the present invention that provides another aspect of the disclosed system for and method of minimizing the measurement errors that would otherwise be introduced by the destination transceiver and any intermediate transceivers. This is particularly valuable for signals traversing more than one transceiver before returning to the source transceiver, as in so-called 'multiple hop' communications in packet transfers, mesh networks, ad-hoc and so on. In these cases, prior art methods which rely on time-tagging, edge detection, or time averaging of a large number of transmissions, will suffer significant errors due to the delays introduced by the demodulation and modulation circuitry in each transceiver. These delays can be many times larger than the delays due solely to the distance between transceivers, and the problem becomes even more challenging when the distances are short and the time delays are correspondingly short.

In FIG. 10, a duplex transceiver pair 100a and 100b is shown with an arrangement of switching units 101a, 101b, 101c, and 101d allowing each transceiver to route the output from the modulation section either to the appropriate medium interface 102 (e.g., antenna, transducer, light source, etc.) or to a frequency converter 103 which changes the carrier frequency from F1 to F2. Note that the switching units are arranged such that the modulated output can be transmitted on either CH1 or CH2, and the signal from either medium interface can be routed to the demodulation section, after appropriate conversion to F1 for signals received on CH2.

In a typical measurement, signal generation in the source transceiver, indicated as 100a in FIG. 10 would occur as described previously. It is assumed that the arbitration process has been completed, and the measurement bit or bit stream is being transmitted. As before, the modulated signal would traverse the medium on channel CH1. The destination transceiver receives it through medium interface 102b, but routes the signal directly to the frequency converter 103b, which changes the carrier frequency to F2. No further processing of the signal is required. The signal is immediately routed to the medium interface 102c and retransmitted on CH2. The source transceiver receives it through medium interface 102d, and performs the logical comparison to determine the delay time, as described above. This measurement will include only the errors that are due to the frequency converter circuit, which are significantly smaller than those which demodulation, processing, and re-modulation would have introduced. The source transceiver may perform a self-test, as discussed previously, as can the destination transceiver, to further characterize (and later correct) delay errors introduced by the transceiver components and medium interfaces.

Distance Measurement and Positioning Applications

Figure 11:
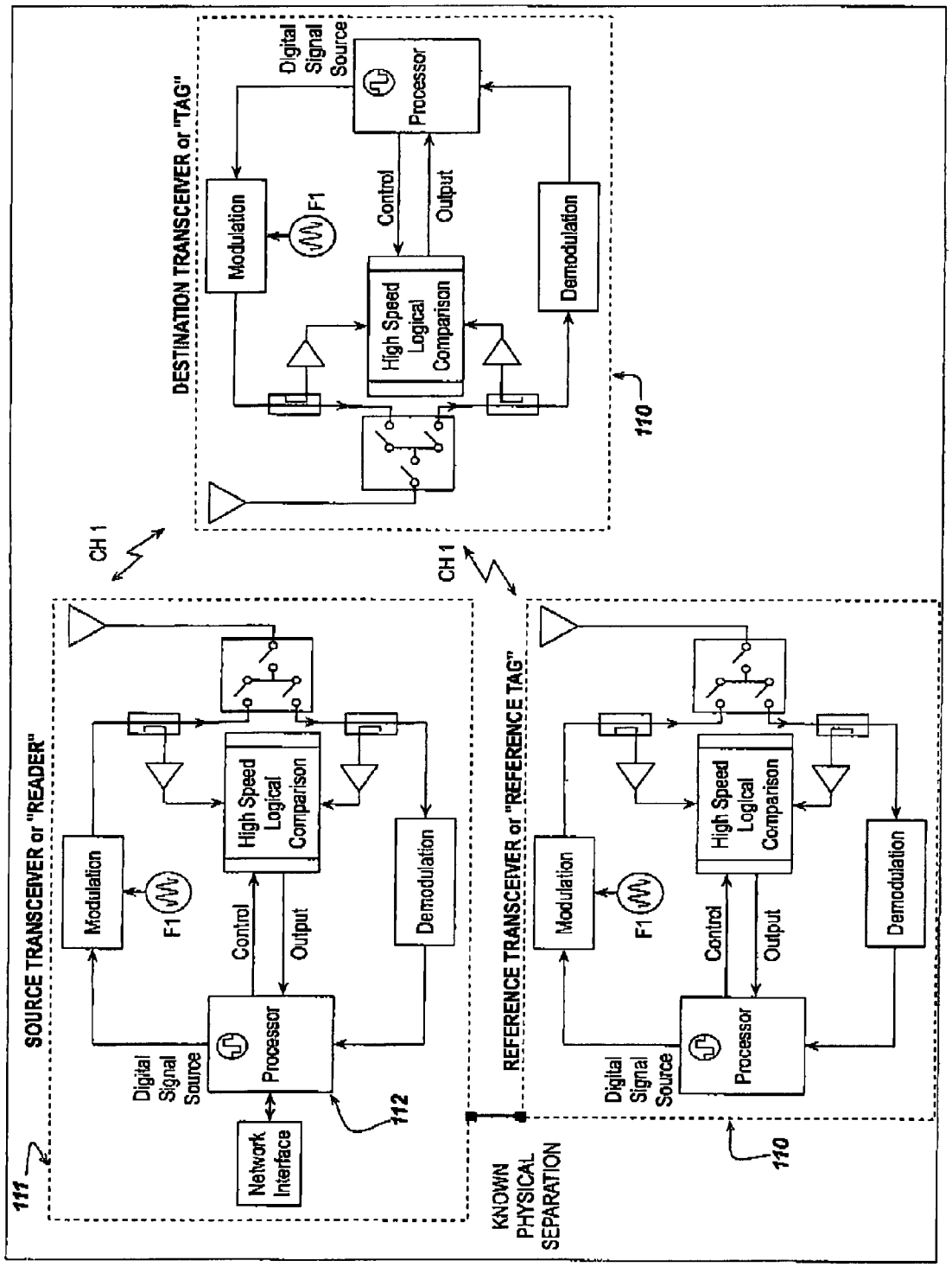
FIG. 11 is a schematic block diagram of a reference pair of transceivers, in which the source transceiver (e.g., Reader) is connected to a network for communication with other system components. The second transceiver of the reference pair is assumed to be a small, portable device (e.g., Tag). A third transceiver, also for example a Tag, is in an unknown location.

If accurate distance measurements are made between multiple transceivers, and the measurements are shared among those transceivers, then the angular position of the transceivers with respect to one another can be determined through triangulation techniques. Specifically, if source and destination transceivers are both positioned at known locations, and their spatial separation remains known, then both the distance and angular position of a third transceiver (relative to the first two) can be determined by the system, as illustrated in FIG. 11. Two transceivers configured this way will be referred to herein, for illustrative purposes only, as 'reference transceivers'. It will be apparent that a reference pair may also be composed of a single transceiver with two medium interfaces, such as a radio transceiver with two antenna inputs, a duplex transceiver, or an ultrasound transceiver with two ultrasound transducers. A 'reference pair' may be composed of any two transceiver types. For example, a system deployed on large mobile machinery may employ one primary transceiver, which may be fully networked with other vehicle systems, along with a simpler, lower cost device placed a known distance away on the same machinery. An embodiment of the present invention capable of determining relative angular position of a plurality of transceivers is described in the following paragraphs.

Readers and Tags

Although there may be many applications and utilities, the above described system and method has particular application and utility with respect to radio frequency indentification systems and methods. Radio Frequency Identification (RFID) technology (passive or active) can be incorporated into any transceiver. The present disclosure does not assume any particular RFID system or standard, and can function without it. Even without RFID data the system will be able to accumulate knowledge of how many destination transceivers are in the field of view, and where they are with respect to the reference transceivers (distance and azimuth angle). The addition of RFID capability will enable the system to determine what type of objects are represented by the destination transceivers (through interpretation of ID data) allowing the system to process alarms, warnings, and corrective actions accordingly.

Transceivers may take the form of small 'Tags', indicated in FIG. 11 at 110, which are affixed to items to be tracked or protected such as personnel, shipping pallets, or structural elements. Such Tags would have minimal components and power consumption, to allow low cost manufacture and long battery life. Other, more capable transceivers might be affixed to larger items such as heavy equipment, fixed structures, ships, automobiles, mobile machinery, or other infrastructure. These may be referred to as 'Readers', indicated in FIG. 11 at 111 in accordance with RFID system terminology. Readers are specifically designed to produce meaningful output to a human operator, or a network providing the exchange of data and commands to and from the transceivers. As such, they will often have network communication interface circuitry.

Figure 12:
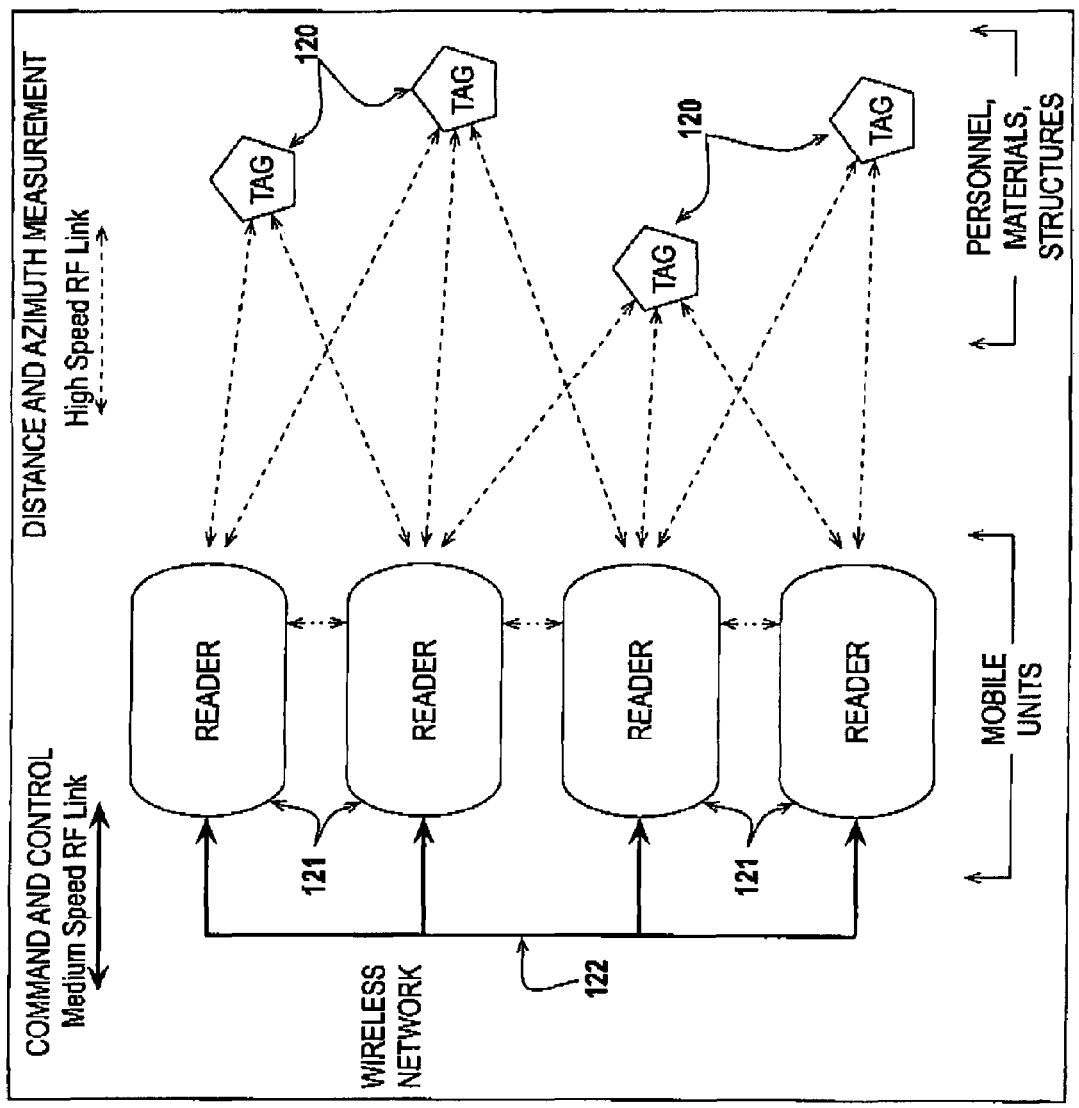
FIG. 12 is a schematic block diagram of a multiple-transceiver system, in which several readers are connected to each other via a wireless network, and illustrates the azimuth angles to be determined in addition to the distance to each Tag.

FIG. 12 illustrates an example of an arrangement of transceivers configured as Readers and Tags, in an architecture which can comply with standard RFID industry practice. The figure shows a number of Tags 120, which are assumed to be inexpensive, small, self-powered, and highly mobile. Readers 121 are shown on mobile platforms, but are connected via a wireless network 122. The network communications are managed by the Readers themselves. Each will recognize the entry or departure of any other. Distance measurements to all in-range Tags will be shared among the Readers. The Readers will also measure the distance between themselves and all other in-range Readers. Azimuth angle determination between Readers and other Readers, and between Readers and Tags, is disclosed in the following paragraphs.

Triangulation

Figure 13:
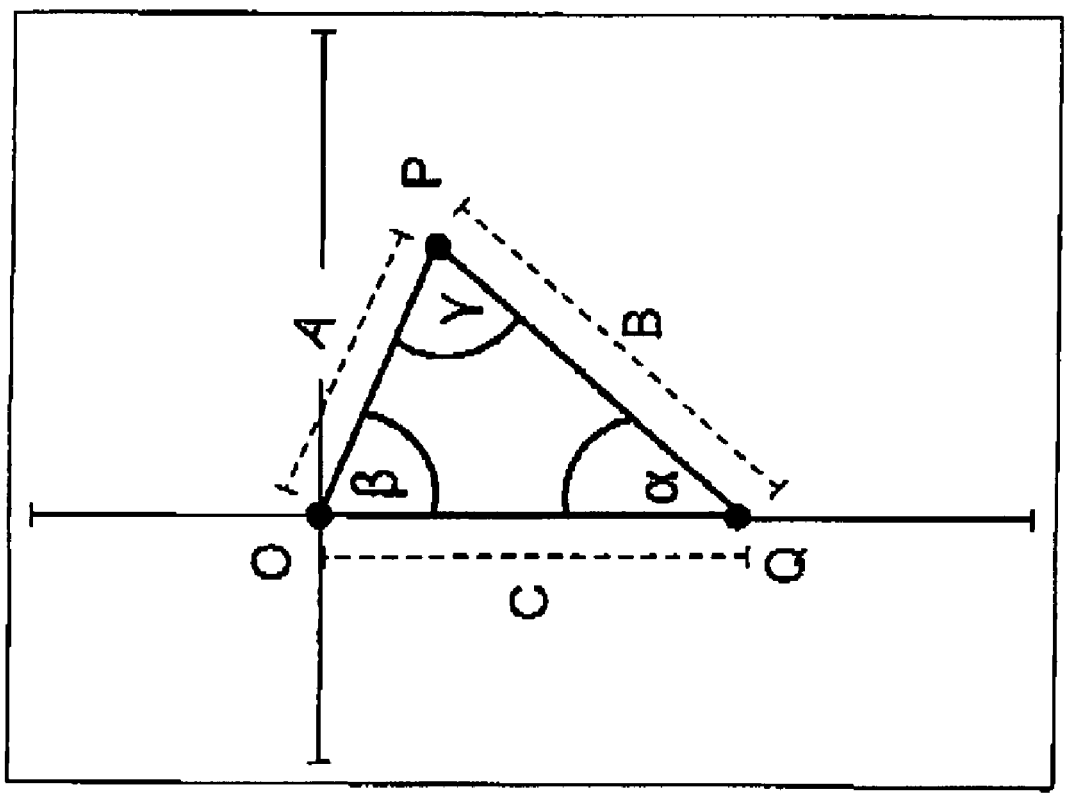
FIG. 13 illustrates the definitions used in the text for using the disclosed methods to perform triangulation calculations and thus determine azimuth angle between transceivers.

An example of a method of triangulation using the signal delay measurement methods described herein is illustrated using the definitions shown in FIG. 13. Transceivers are located at points O, P and Q. Arbitrarily, O and Q are assigned to be a reference pair, i.e., they are comprised of a single source transceiver with two media interfaces, or two source transceivers. It is assumed that the distance C between them is known, and remains fixed, and that an imaginary line joining them makes a known angle with the mobile platform on which they are both mounted. This means that determination of the angles α and β, along with either length A or B, will uniquely define the position of the transceiver at P, with respect to the mobile platform.

The unknowns may be calculated as follows. The Law of Cosines applies to each side of this triangle, so that:

$$C^2 = A^2 + B^2 - 2AB\cos(\gamma) \tag{1}$$

$$B^2 = A^2 + C^2 - 2AC\cos(\beta) \tag{2}$$

$$A^2 = B^2 + C^2 - 2BC\cos(\alpha) \tag{3}$$

A and B will be provided by the transceivers themselves. In fact, the transceiver at O will determine A and C, the transceiver at P will determine A and B, and the transceiver at Q will determine B and C, each using the signal delay measurement method of this invention, so that verification of the measurements and/or averaging or other error corrections may be applied. The algorithms and calculations can be carried out on the processor of the transceiver (112 in FIG. 11), or a separate processor in the transceiver, or separate from the transceiver. Since A, B, and C are now known, all three of the angles can be calculated using the equations below:

$$\cos(\gamma) = (A^2 + B^2 - C^2)/2AB \tag{4}$$

$$\cos(\beta) = (A^2 + C^2 - B^2)/2AC \tag{5}$$

$$\cos(\alpha) = (B^2 + C^2 - A^2)/2BC \tag{6}$$

Two-dimensional azimuth angle measurements for the destination transceivers may be obtained using two methods. The first method, using a single source transceiver on each mobile platform, uses two or more media interface sections for each source transceiver. For a system using radio signals through air, for example, this can comprise two or more source transceiver antennas or two or more separate source transceiver units located at known, fixed distances from each other on the same vehicle. Either simplex or duplex communication may be used, as described earlier, however the dual-frequency nature of duplex communications lends itself readily to the use of multiple antennas.

Another example of a method and system involves multiple source transceivers (one or more per mobile platform) operating in the same area as seen in FIG. 12. In either case, measurements for a given transceiver, from a given reference pair, will be compared with similar results from nearby transceivers in a process of real-time verification and error reduction. It will be apparent that use of three transceivers in a reference set will allow three dimensional positioning in a method substantially similar to that shown for two dimensional positioning.

Network Formation and Data Sharing

The ability of the system and method to perform the azimuth angle measurement function depends primarily on rapid and accurate distance determination between destination transceivers and source transceivers, but also on the systems' ability to coordinate the acquired distance measurements and identification data between source transceivers. This can be managed over an ad hoc wireless network, indicated by way of example at 122 in FIG. 12, established between the source transceivers. Coordination over this 'command and control' network will allow continual refinement of both distance and azimuth angle measurements when more than one source transceiver is operating in an area, as well as 'traffic management' of the higher speed channels (CH1 and CH2). These features will tend to improve overall measurement accuracy in crowded work areas, rather than degrade it. Referring again to FIG. 12, the distance measurement data paths are shown as dashed arrows, and the lower speed command and control paths are shown as solid arrows.

It is anticipated that the methods and systems disclosed herein will be deployed in many applications using multiple mobile platforms which arrive and depart in an unpredictable manner. Such might be the case in construction, mining, agricultural, and materials handling environments, boating, highway, and emergency location applications, among others. The capability for multiple transceivers to communicate and share distance and azimuth angle measurements as they approach and operate near each other is a substantial advantage of the present invention. A typical scenario might involve 3 or 4 vehicles and 10 pedestrian workers within a work area, with their associated source transceivers and destination transceivers (Readers and Tags). These devices will detect the presence and range information of all the others, and azimuth angles as well, allowing each transceiver to make appropriate warnings or take other actions. By enabling the formation of ad hoc networks as multiple Readers operate within a common area, using techniques and systems readily available in the marketplace, the quality of the distance and azimuth measurements is improved dramatically. Multiple measurements can be made during each interrogation cycle, and the results shared between Readers.

Simple averaging, or more complex analyses well known to those skilled in the arts, may be performed with the data.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of determining a measurement of the time required for a digital bit or a bit stream including a plurality of bits to traverse a round-trip path from a source transceiver to at least one destination transceiver and back, the method comprising:

comparing the relative timing between (a) one or more transmitted bits transmitted from the source transceiver to one destination transceiver and (b) corresponding one or more return bits transmitted from the destination transceiver back to the source transceiver, wherein the step of comparing includes using a high speed comparison configuration so as to provide in substantially real-time one or more measurements related to or derived from a measurement of the time required by each of said one or more transmitted bits and the corresponding one or more return bits to traverse a respective portion of the round trip path.

2. A method according to claim 1, wherein comparing the relative timing includes using the high speed comparison configuration located at the source transceiver, or at both the source and destination transceivers.

3. A method according to claim 1, further including transmitting the one or more transmitted bits at a clock rate, and sampling the one or more transmitted bits and the corresponding one or more return bits at a multiple of the clock rate prior to comparing the relative timing of the one or more transmitted bits and the corresponding one or more return bits.

4. A method according to claim 1, further including determining a measurement of the distance between the source transceiver and the destination transceiver as a function of the time required to traverse the round trip path.

5. A method according to claim 1, further including determining the two dimensional azimuth angle between the source transceiver and two other transceivers including the destination transceiver.

6. A method of determining a measurement of the time required for a digital bit or bit stream to traverse a round-trip path from a source transceiver to at least one destination transceiver and back, the method comprising:

comparing the relative timing between (a) a transmitted bit or bit stream transmitted from the source transceiver to one destination transceiver and (b) a return bit or bit stream transmitted from the destination transceiver back to the source transceiver, wherein the step of comparing includes using a high speed comparison configuration so as to provide in substantially real-time one or more measurements related to or derived from a measurement of the time required by the transmitted bit or bit stream and the return bit or bit stream to traverse the round trip path; wherein comparing the relative timing includes measuring errors in such comparison in substantially real-time, and correcting for such errors.

7. A method according to claim 6, wherein the errors are one or more of the following:

fixed delays and jitter.

8. A method of obtaining a measurement of a time delay between (a) the transmission at a clock rate of a transmitted digital signal by a first transceiver to a second transceiver and (b) the reception of a return digital signal transmitted by the second transceiver to the first transceiver in response to receiving the transmitted digital signal, the method comprising:

oversampling the return digital signal at an oversampling rate S so as to provide an oversampled return digital signal, wherein the oversampling rate S is a multiple of the sampling clock rate of the transmitted digital signal;

comparing the transmitted digital signal to the oversampled return digital signal and generating at least two bytes of bits at the oversampled rate wherein each byte has a leading and a trailing edge, one of the bytes corresponding to a differential time period measurement during which the leading edge of the transmitted digital signal is transmitted and the leading edge of the return digital signal is received by the first transceiver, and the other of the bytes corresponding to a differential time period measurement during which the trailing edge of the transmitted digital signal is transmitted and the trailing edge of the returned digital signal is received by the first transceiver;

assigning a value to each of the bytes as a function of the ordering of the bits within each of the bytes so as to include a least significant bit and a most significant bit, wherein the sequence of the least significant bit to most significant bit of one byte is temporally reversed for the second byte; and determining the time delay as a function of the assigned values of the two bytes.

9. The method according to claim 8, further including: compensating for noise in the return digital signal.

10. The method according to claim 9, wherein the step of compensating for noise in the return digital signal includes compensating for an out-of-phase component of the noise.

11. The method according to claim 10, wherein the step of compensating for the out-of phase component of noise includes:

determining the out-of phase component as a function of the difference between the logical inverse of one of the bytes and the logical value of the other of the bytes.

12. A system for making a measurement of the amount of time required for at least one digital bit to traverse a round-trip path from a source transceiver to at least one destination transceiver and back, the system comprising:

a high speed comparison configuration configured and arranged so as to (a) determine a measurement of the relative timing between a transmitted bit produced at a clock rate by the source transceiver and transmitted to a destination transceiver, and a corresponding return bit produced by the destination transceiver in response to receiving a respective transmitted bit from the source transceiver and received by the source transceiver; and (b) provide in substantially real-time at least one measurement related to or derived from a measurement of the time required for the transmitted bit and the corresponding return bit to traverse the round trip path.

13. A system according to claim 12, wherein the high speed comparison configuration is located at the source transceiver, or at both the source and destination transceivers.

14. A system according to claim 12, further including a sampling configuration configured so as to sample each transmitted bit and the corresponding return bit at a multiple of the clock rate of the transmitted bit prior to comparing the relative timing between each transmitted bit and its corresponding return bit.

15. A system according to claim 12, further including a processor configured and arranged so as to determine the distance between the source transceiver and the destination transceiver as a function of the time required to traverse the round trip path.

16. A system according to claim 12, further including a processor configured and arranged so as to determine the two dimensional azimuth angle position of the source transceiver with respect to the destination transceiver and one other transceiver.

17. A system for making a measurement of the amount of time required for a digital bit or bit stream to traverse a round-trip path from a source transceiver to at least one destination transceiver and back, the system comprising:

a high speed comparison configuration configured and arranged so as to (a) determine a measurement of the relative timing between a transmitted bit or bit stream produced at a clock rate by the source transceiver and transmitted to a destination transceiver, and a return bit or bit stream produced by the destination transceiver in response to receiving the transmitted bit or bit stream from the source transceiver and received by the source transceiver; (b) provide in substantially real-time at least one measurement related to or derived from a measurement of the time required to traverse the round trip path, wherein the high speed comparison configuration includes an error correction circuit configured and arranged so as to measure and correct for errors.

18. A system according to claim 17, wherein the error correction circuit is configured and arranged so as to correct for one or more of the following: fixed delays and jitter.

19. A system for determining the distance between two transceivers in substantially real time using a measurement of the delay between (a) transmission at a clock rate of a transmitted digital signal by one of the transceivers functioning as a source transceiver and the other of the transceivers functioning as a destination transceiver and (b) reception of a return digital signal transmitted by the destination transceiver to the source transceiver in response to receiving the transmitted digital signal, the system comprising:

the source and destination transceivers configured and arranged so as to define at least in part a round trip transmission path of the transmitted digital signal and the return digital signal:

the source transceiver including an oversampling component configured and arranged so as to oversample the return digital signal at an oversampling rate S so as to provide an oversampled return signal, wherein the oversampling rate S is a multiple of the clock rate of the transmitted digital signal;

a high speed comparison configuration configured and arranged so as to compare the transmitted digital signal to the oversampled return digital signal and generating at least two bytes of bits at the oversampling rate, wherein one of the bytes corresponds to a measurement of a differential time period during which a leading edge of the transmitted digital signal is transmitted and a leading edge of the return digital signal is received by the source transceiver, and the other of the bytes corresponds to a measurement of the differential time period during which a trailing edge of the transmitted digital signal is transmitted and a trailing edge of the returned signal is received by the source transceiver;

a value assignment component configured and arranged so as to assign a value to each of the bytes as a function of an ordering of the bits of each of the bytes, wherein the sequence of the least significant bit to most significant bit of one byte is temporally reversed; and a delay determination component configured and arranged so as to determine the delay as a function of the assigned values of the two bytes.

20. The system according to claim 19, further including a processor configured and arranged so as to accumulate a plurality of assigned values representing the delays for a plurality of transmitted and returned bits.

21. The system according to claim 20, further including a noise compensation component configured and arranged so as to compensate for noise in the return digital signal.

22. The system according to claim 21, wherein the noise compensation component is configured and arranged so as to compensate for an out-of-phase component of the noise.

23. The system according to claim 22, wherein the noise compensation component is configured and arranged so as to determine the out-of-phase component of noise as a function of the difference between a logical inverse of one of the bytes to a logical value of the other of the bytes.

24. The system according to claim 19, further including a noise compensation component configured and arranged so as to compensate for noise in the return digital signal.

25. The system according to claim 24, wherein the noise compensation component is configured and arranged so as to compensate for an out-of-phase component of the noise.

26. The system according to claim 25, wherein the noise compensation component is configured and arranged so as to determine an out-of-phase component as a function of the difference between a logical inverse of one of the bytes to a logical value of the other of the bytes.

* * * * *